Aug. 17, 1965 G. H. BALDING 3,201,748

SYMBOL GENERATOR CIRCUIT FOR AIRCRAFT

Filed Nov. 26, 1962 2 Sheets-Sheet 1

INVENTOR.
GEORGE H. BALDING

BY [signature]

AGENT

INVENTOR.
GEORGE H. BALDING
BY
[signature]
AGENT 3,201,748

SYMBOL GENERATOR CIRCUIT FOR AIRCRAFT

George H. Balding, Fremont, Calif., assignor, by mesne assignments, to the United States of America as represented by the Secretary of the Navy Filed Nov. 26, 1962, Ser. No. 240,188
5 Claims. (Cl. 340—27)

The present invention relates to a symbol generator and more particularly to a release marker generator providing a plus sign symbol for use with a video display.

With the advent of high speed aircraft, increasingly complex instrumentation systems for use therein have become necessary. Such instrumentation systems so heavily burden aircraft pilots with routine flight matters as to seriously affect their efficiency in carrying out a specific mission. Thus, it is apparent that a single display system integrating all information concerning aircraft attitude, heading, speed, relative position with respect to a target, etc. is vital. At the same time it is also necessary to present this information in a single-integrated display whereby continuous representations of true world conditions are displayed as to enable a pilot to orient the aircraft to its proper flight mode with respect to earth by sole reliance on the artificial display before him. Such a system is disclosed by application Serial No. 16,438, filed March 21, 1960, now Patent No. 3,118,128 issued January 14, 1964, having the same inventor as the present invention.

The present invention is concerned with the generation of a release marker symbol (time-to-go symbol) of cross-shaped or plus sign configuration for display on a television type screen similar to that disclosed in the above-mentioned application. More specifically, the present invention contemplates an electronic circuit for generating signals representative of small vertical and horizontal bars which when fed into the video path of a display unit similar to that disclosed in the above-mentioned application will form intersecting vertical and horizontal bars on the screen thereof.

The plus sign symbol is basically generated by forming narrow and wide vertical signals in the symbol generator. Horizontal signals are then mixed with the vertical signals and effectively by means of "and" circuits blank out that portion of the vertical lines which are undesired. In other words, by gating only that portion of the wide vertical line and thin vertical line by means of synchronized horizontal pulses, signals representative of a short vertical bar and a short horizontal bar are provided to the video path of a display system.

The particular system for displaying the plus sign symbol generated by the present invention forms no part of this invention. For completeness, however, it is pointed out that it may comprise a cathode ray tube whereon the plus sign is formed. The display on the face of the cathode ray tube is then detected by a vidicon camera which causes the plus sign to be displayed on a television-type screen.

The release marker symbol may be caused to move down the television-type screen of the display system along the artificial flight path displayed thereon at a rate proportional to aircraft speed. Furthermore, the legs of the plus sign may be made to increase in size as it approaches the bottom of the display or alternately to be of a constant size as it moves across the display screen. Coordinates of the position and size of the symbol may be provided by a speed computer in the aircraft.

Therefore, it is an object of the present invention to provide an electronic generator for providing a plus sign symbol for display on a display screen.

It is another object of the present invention to provide an electronic circuit for separately generating signals representative of a short horizontal bar and a short vertical bar for display on a display screen.

It is still another object of the present invention to provide an electronic circuit for separately generating and combining signals representative of a short horizontal bar and a short vertical bar to form a plus sign symbol on a display system.

Other objects and features of the invention will become apparent to those skilled in the art as the disclosure is made in the following detailed description of a preferred embodiment of the invention as illustrated in the accompanying drawing in which.

Figure 1:
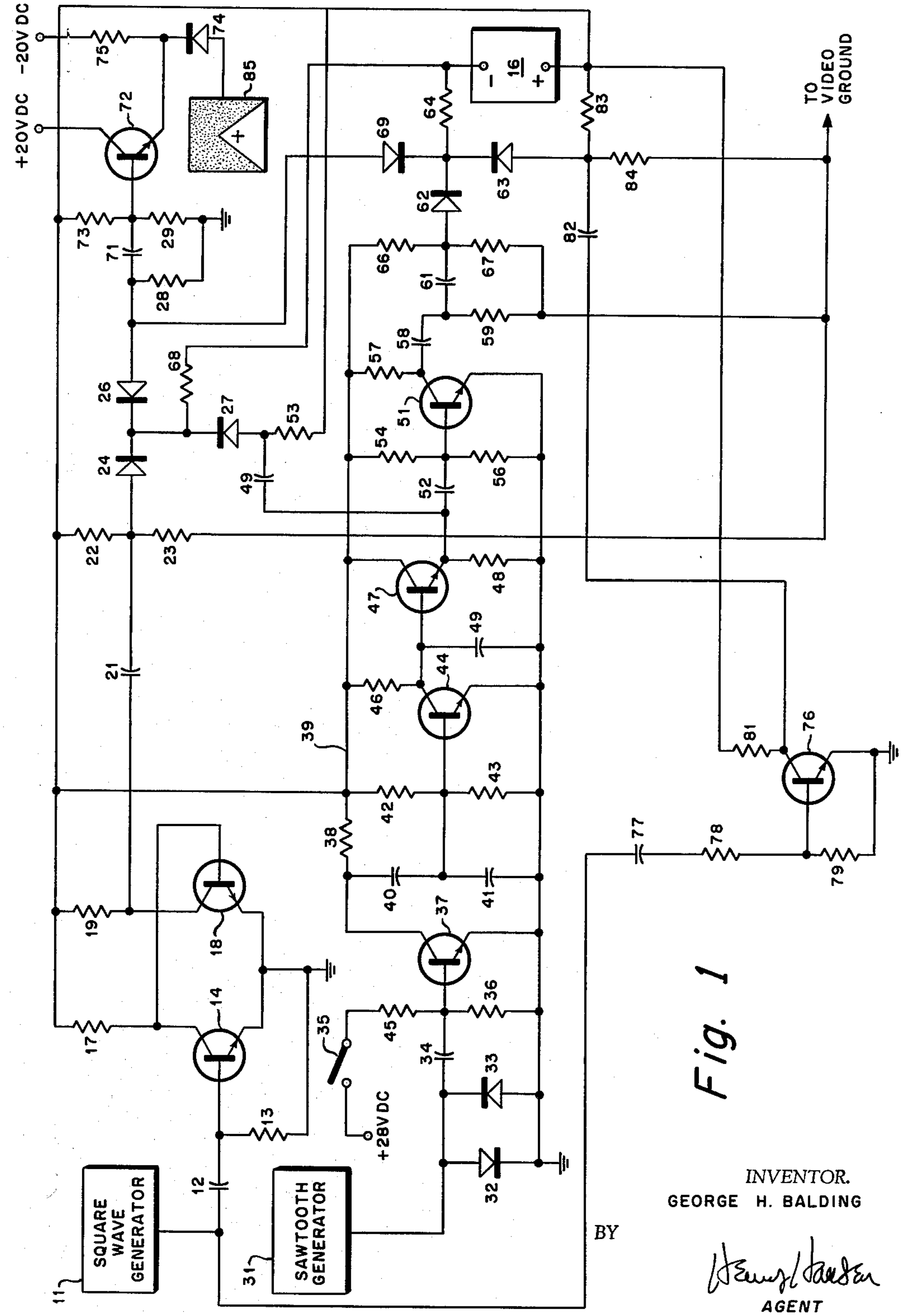
FIG. 1 illustrates in schematic representation the preferred embodiment of the invention.

Referring now more particularly to FIG. 1, there is shown a square wave generator 11 having an output terminal connected to one side of capacitor 12. The other side of capacitor 12 is connected to one side of resistor 13 and to the base of transistor 14. The collector of transistor 14 is connected to the positive side of D.C. voltage source 16 through resistor 17. The collector of transistor 14 is connected also to the base of transistor 18. The collector of transistor 18 is connected to voltage source 16 through resistor 19. The emitters of transistors 14 and 18 are connected in common with one side of resistor 13 to ground. The collector of transistor 18 is connected through capacitor 21 to the common junction of resistors 22 and 23. One side of resistor 22 is connected to power supply 16 while one side of resistor 23 is connected to ground. "And" circuit comprising diodes 24, 26, 27 is connected to the common junction of resistors 22 and 23.

Sawtooth generator 31 has an output connected to one side of the clipping circuit which comprises diodes 32 and 33 having the polarity shown. The other side of the clipping circuit is connected to ground. Differentiating network which comprises capacitor 34 and resistor 36 is connected between the clipping circuit and the base of transistor 37. The emitter of transistor 37 is connected to ground while its collector is connected to the voltage source 16 through resistor 38 via common conductor 39. connected between the collector of transistor 37 and ground are capacitors 40 and 41. Connected between common conductor 39 and ground are resistors 42 and 43 which form a voltage divider type biasing network. The common junction of resistors 42 and 43 which is connected to the common junction of capacitors 40 and 41 is connected to the base of transistor 44 whose collector is connected to common conductor 39 through resistor 46 and whose emitter is connected to ground. The collector of transistor 44 is connected also to the base of transistor 47 whose collector is connected to common conductor 39 and whose emitter is connected to ground through resistor 48. Capacitor 49 is connected between the base of transistor 47 and ground.

The emitter of transistor 47 is connected to diode 27 through capacitor 49 as shown and to the base of transistor 51 through capacitor 52. Diode 27 is also connected to voltage source 16 through resistor 53.

A voltage divider-type biasing network which comprises resistors 54 and 56 is connected at opposite ends to common conductor 39 and ground and at the junction of the resistors 54 and 56 to the base of transistor 51 whose emitter is connected to ground and whose collector is connected to common conductor 39 through resistor 57. The collector of transistor 51 is connected to ground through capacitor 58 and resistor 59. The junction of capacitor 58 and resistor 59 is connected to diode 62 of "and" circuit comprising diode 62, diode 63, and resistor 64 connected as shown through capacitor 61. The junction of voltage divider comprising resistors 66 and 67 is connected to diode 62.

Resistor 64 is connected to the common junction of diodes 24, 26, and 27 through resistor 68 while diode 26 is connected to the juncture of diodes 62 and 63 and resistor 64 through diode 69. Capacitor 71 is connected between the base of transistor 72 and the common point of juncture of diodes 26 and 69. Resistors 28 and 29 are connected in common at one end to ground and at the other end to opposite sides of capacitor 71. Resistor 73 connects the base of transistor 72 to a —20VDC source while its collector is directly connected to a +20VDC source.

The output of square wave generator is also connected to the base of transistor 76 through capacitor 77 and resistor 78. The emitter of transistor 76 is connected to ground while its base is connected to ground through resistor 79. The collector of transistor 76 is connected to voltage source 16 through resistor 81. The output of transistor 76 is connected to diode 63 which together with diode 62 and resistor 64 forms an "and" circuit through capacitor 82. Diode 63 is also connected to voltage source 16 through resistor 83. The junction of capacitor 82, diode 63, and resistor 83 is connected to ground through resistor 84. The junction of diode 69 and resistor 64 is connected to the negative side of power supply 16. The collector of transistor 72 is connected to a +20VDC voltage source while the emitter thereof is connected to a —20VDC voltage source through resistor 73. The emitter of transistor 72 is also connected to video display 85.

Square wave generator 11 provides negative square wave pulses which occur at the horizontal sweep rate of 15,750 c.p.s. while sawtooth generator 31 provides a negative sawtooth pulse at 60 c.p.s. vertical sweep rate. The sweep rate of these two waveform generators is compatible with the television-type presentation contemplated in the application mentioned above. The present invention may be used with a cathode ray tube utilizing the sweep generators used therewith.

Figure 2:
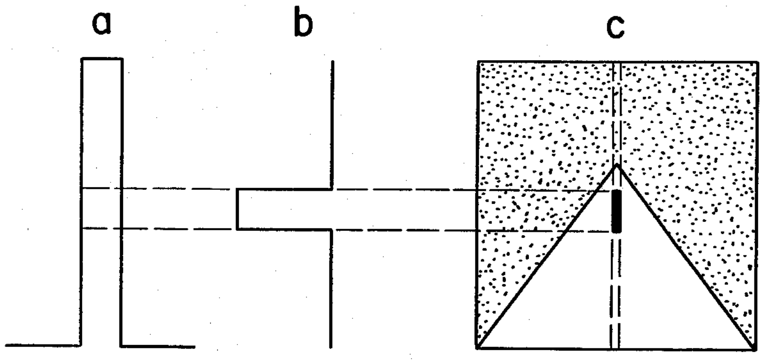
FIG. 2 illustrates the relationship between vertical and horizontal pulses to form a vertical bar on a display screen.

The negative square wave from square wave generator 11 is applied to the base of transistor 14 after being differentiated by differentiating circuit comprising capacitor 12 and resistor 13. The pulse is amplified in transistors 14 and 18 and appears at the collector of transistor 18 as a narrow vertical pulse as shown in illustration A of FIG. 2. This narrow square vertical square pulse which occurs at the horizontal sweep rate is applied to diode 24 which together with the diodes 26 and 27 from an "and" circuit. At the same time, a negative square wave (the formation of which is to be discussed more fully hereinbelow) is applied to diode 27 of the "and" circuit through capacitor 49 from the emitter of transistor 47. This negative square pulse from emitter of transistor 47 occurs at the vertical sweep rate and for purposes of representation is as shown by illustration B of FIG. 2. If the vertical pulse from transistor 18 were applied to the video circuit of the display unit 85 directly without going through the "and" circuit, it would appear on the screen as a dark vertical line throughout the length of the screen as denoted by the dotted lines in illustration C of FIG. 2. However, the pulse square wave from the emitter of transistor 47 allows only that part of the vertical pulse from transistor 18 to pass through the "and" circuit as shown in illustration C of FIG. 2. In other words, an output from the "and" circuit is obtained only when both pulses are present. Obviously, by changing the circuit parameters, the negative pulse from transistor 47 may be made to occur at any desired time during the vertical sweep thereby causing the vertical bar to be presented on the screen of the display unit 85 at any desired vertical position on the screen.

The generation of the horizontal part of the plus sign symbol occurs in the same basic manner as that of the vertical bar. The negative sawtooth wave from sawtooth generator 31 is clipped by diodes 32, 33, differentiated by differentiating circuit comprising capacitor 34 and resistor 36 and amplified by transistors 37 and 44. Transistor 47, whose emitter provides the output to diode 27, provides the same negative pulse to the base of transistor 51 wherein it is further amplified and as differentiated by the differentiatign circuit comprising capacitors 58 and 61 and resistor 67. The input to diode 62, which together with diode 63 and resistor 64 forms a second "and" circuit, is a pulse having a sharp negative peak.

At the same time, transistor 76 amplifies the pulse from square wave generator 11 which has been differentiated by means of the differentiating circuit comprising capacitor 77, resistors 78 and 79. The output from transistor 66 is a square negative pulse which occurs approximately between horizontal sync signals. The negative spike pulse from transistor 51 occurs at the vertical rate of sawtooth generator 31.

Figure 3:
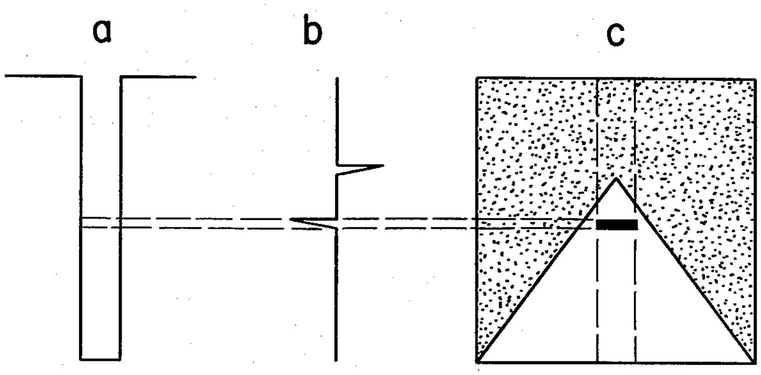
FIG. 3 illustrates the relationship between vertical and horizontal pulses to form a horizontal bar on a display screen.

The negative vertical square pulse from transistor 76 has the form shown by illustration A in FIG. 3. The negative spike pulse which is applied to diode 62 has the form as shown in illustration B of FIG. 3. When both signals, that is the negative pulse from transistor 76 and the negative spike pulse applied to diode 62 occur at the same time an output is provided from the junction of diodes 62 and 63 and resistors 64 which applied to the video circuit of display unit 85 causes a horizontal bar to be formed on the screen thereof. Since both signals must be present at the "and" circuit for an output, a signal is obtained only at the intersection of these pulses as shown in FIG. 3. Both the signals representative of the short vertical bar and the short horizontal bar are mixed at the junction of diodes 26 and 69 and amplified by transistor 72 for input into the video circuit of the display unit 85.

FIG. 1 shows the screen of display unit 85 with the plus sign visible thereon. The triangular portion and dotted portion are simulative of flight path and terrain respectively and are shown for completeness. It is pointed out that separate electronic generating circuits, which are not part of this invention, are necessary for forming the flight path and terrain representative signals.

Closure of switch 35 causes the 28 volt source to bias transistor 37 off and is effective to prevent the formation of the horizontal and vertical bar signals. This results because sawtooth generator 31 which supplies the second voltage to each of the "and" circuits is in effect disconnected from the rest of the circuit.

Obviously, many modifications and variations of the present invention are possible in the light of the above teachings. It is, therefore, to be understood, that within the scope of the appended claims, the invention may be practiced otherwise than as specifically described.

What is claimed is:

1. An electronic symbol generator comprising:

a horizontal sweep means;

first means to insert a pulse during a predetermined portion of a horizontal sweep;

second means to insert a pulse during a portion of said horizontal sweep less than the portion in said first means;

a vertical sweep means;

third means to insert a pulse during a portion of a vertical sweep;

fourth means to insert a pulse during a portion of said vertical sweep less than the portion in said third means;

first "and" circuit means receiving pulses from said first means and said fourth means and passing a pulse upon the simultaneous occurrence of pulses from said first and fourth means;

second "and" circuit means receiving pulses from said second means and said third means and passing a pulse upon the simultaneous occurrence of pulses from said second and third means; and means to send from either "and" circuit means a display of the pulses passed therethrough.

2. An electronic symbol generator as recited in claim 1 wherein said first means and said second means comprise:

a square wave generator having a pulse period equal to said horizontal sweep period;

first pulse forming means actuated by said square wave generator and forming a pulse during a portion of said square wave; and second pulse forming means actuated by said square wave and producing a pulse during a portion of said square wave less than the portion in said first pulse forming means; and wherein said third and fourth means comprise:

a sawtooth generator having a pulse period equal to said vertical sweep period;

third pulse forming means actuated by said sawtooth generator and forming a pulse during a portion of said sawtooth pulse period; and fourth pulse forming means actuated by said sawtooth generator and forming a pulse during a portion of said sawtooth pulse period less than said portion in said third pulse forming means.

3. An electronic symbol generator according to claim 2 wherein said third pulse forming means comprises:

transistor means;

circuit means connected between the base of said transistor means and said sawtooth generator means for clipping and differentiating the pulses from said sawtooth generator means;

transistor amplifier means connected to said transistor means; and conductor means connecting the emitter of said transistor amplifier means to said second "and" circuit means.

4. An electronic symbol generator according to claim 3 wherein said fourth pulse forming means comprises:

transistor amplifier means connected to the output terminal of said third pulse forming means;

differentiating circuit means connected between the collector of said transistor amplifier means and said first "and" circuit means whereby the pulse from said third pulse forming means is converted into a narrow voltage spike for application to said first "and" circuit means.

5. An electronic symbol generator according to claim 4 further comprising:

output transistor means, the pulses from said first and second "and" circuit means being conducted to the base of said output transistor means;

a diode connected to the emitter of said output transistor means, said diode being normally biased to nonconduction and said pulses being operable to bias said diode to conduct.

References Cited by the Examiner

UNITED STATES PATENTS

| | | | |
|---|---|---|---|
| 2,895,784 | 7/59 | Rocha | 328—157 |
| 3,103,658 | 9/63 | Chiang | 340—324.1 |
| 3,112,413 | 11/63 | Zimbel | 307—88.5 |

NEIL C. READ, *Primary Examiner.*